US012695719B2

(12) United States Patent
Atreya et al.

(10) Patent No.: US 12,695,719 B2
(45) Date of Patent: Jul. 28, 2026

(54) METHOD, DEVICE, AND SYSTEM FOR MANAGING DOMAIN NAME RESOLUTION

(71) Applicant: Cambium Networks Limited, Devon (GB)

(72) Inventors: Vivek Lakshminarayana Atreya, Bengaluru (IN); Shashi Hosakere Ankaiah, Bengaluru (IN); Trevor Miranda, San Francisco, CA (US)

(73) Assignee: Cambium Networks Limited, Devon (GB)

( * ) Notice: Subject to any disclaimer, the term of this patent is extended or adjusted under 35 U.S.C. 154(b) by 33 days.

(21) Appl. No.: 18/800,135

(22) Filed: Aug. 12, 2024

(65) Prior Publication Data

US 2025/0343780 A1    Nov. 6, 2025

(30) Foreign Application Priority Data

May 2, 2024    (IN) .............................. 202441035014

(51) Int. Cl.
H04L 61/4511        (2022.01)
H04L 9/40            (2022.01)
H04L 69/16           (2022.01)
(52) U.S. Cl.
CPC .......... H04L 61/4511 (2022.05); H04L 63/10 (2013.01); H04L 69/169 (2013.01)

(58) Field of Classification Search
None
See application file for complete search history.

(56) References Cited

U.S. PATENT DOCUMENTS

| | | | |
|---|---|---|---|
| 2018/0034808 A1* | 2/2018 | Mohamad Abdul | ........................ H04L 63/102 |
| 2023/0115859 A1* | 4/2023 | Su | ........................ H04L 63/0485 713/151 |
| 2025/0202912 A1* | 6/2025 | Savin | ................... H04L 63/1416 |

FOREIGN PATENT DOCUMENTS

| | | | | |
|---|---|---|---|---|
| CN | 116962346 A | 10/2023 | | |
| EP | 4572231 A1 * | 6/2025 | ......... | H04L 63/0428 |
| WO | 2023110844 A1 | 6/2023 | | |

* cited by examiner

*Primary Examiner* — Joshua Joo
(74) *Attorney, Agent, or Firm* — Kendal M. Sheets

(57)                ABSTRACT

A method, device, and system for managing Domain Name System (DNS) filtering is disclosed. The method may include blocking an end-device from accessing a domain for a predefined time duration using an encrypted communication protocol to access a domain name resolution service. The method may further include determining failure of the end-device to switch to an unencrypted communication protocol to access the domain name resolution service, after expiry of the predefined time duration. The method may include identifying the end-device as a headless device; and permitting the end-device to access the domain name resolution service using the encrypted communication protocol.

20 Claims, 7 Drawing Sheets

Device Classification Database 302

| MAC Address | Device Attributes |
|---|---|
| 00:00:5e:00:53:af | Make, Brand, IsHeadless, Type, OS, OSVersion |
| 2C:54:91:88:C9:E3 | Make, Brand, IsNotHeadless, Type, OS, OSVersion |

DNS Preferences Database 304

| Device Attributes | Headless Device (*optional) | Current Communication Protocol Used | Capability to switch to unencrypted Communication Protocol |
|---|---|---|---|
| Make, Brand, IsHeadless, Type, OS, OSVersion | Yes | Encrypted | No |
| Make, Brand, IsNotHeadless, Type, OS, OSVersion | No | Encrypted | Yes |

FIG. 3

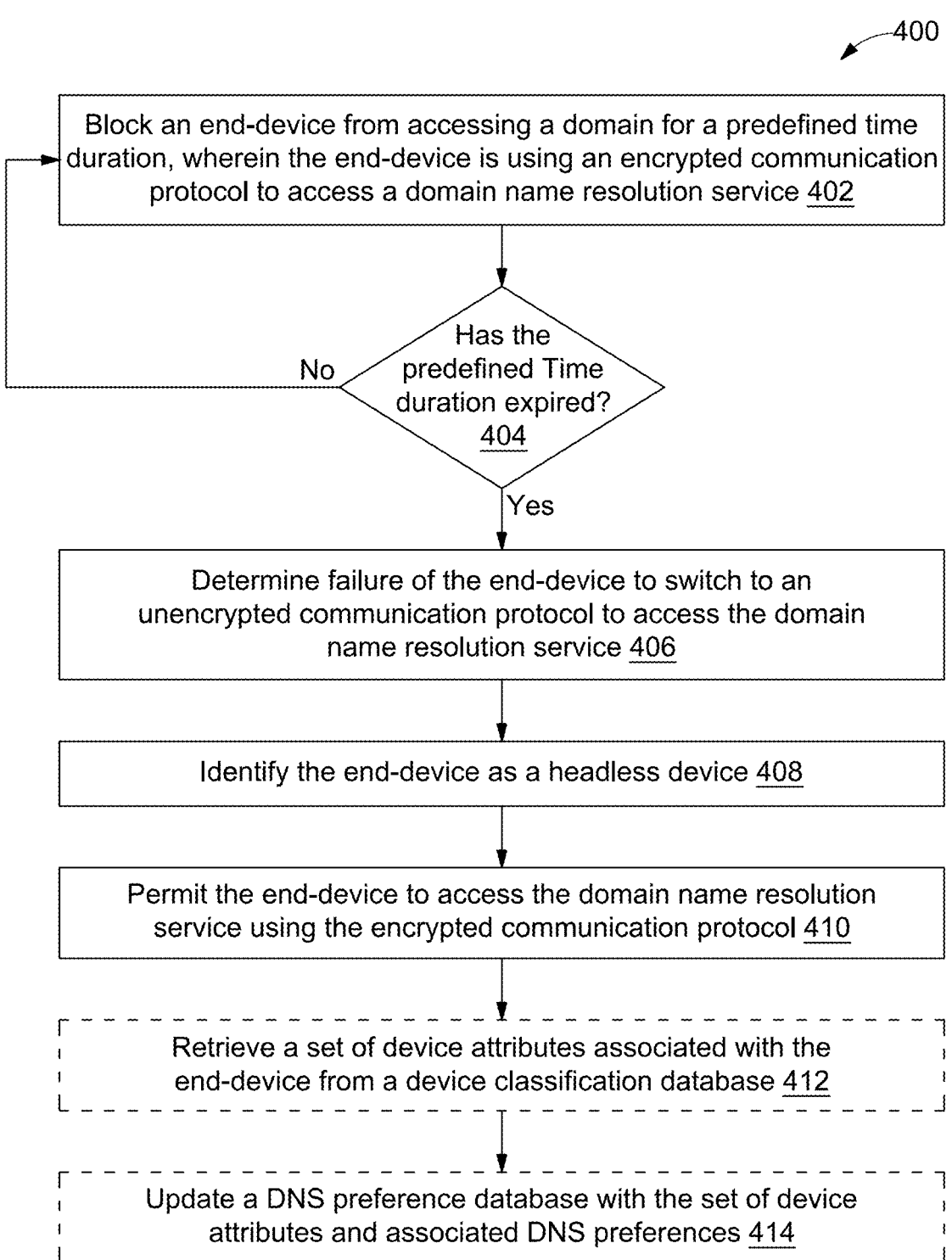

Block an end-device from accessing a domain for a predefined time duration, wherein the end-device is using an encrypted communication protocol to access a domain name resolution service 402

Has the predefined Time duration expired? 404

No

Yes

Determine failure of the end-device to switch to an unencrypted communication protocol to access the domain name resolution service 406

Identify the end-device as a headless device 408

Permit the end-device to access the domain name resolution service using the encrypted communication protocol 410

Retrieve a set of device attributes associated with the end-device from a device classification database 412

Update a DNS preference database with the set of device attributes and associated DNS preferences 414

FIG. 4

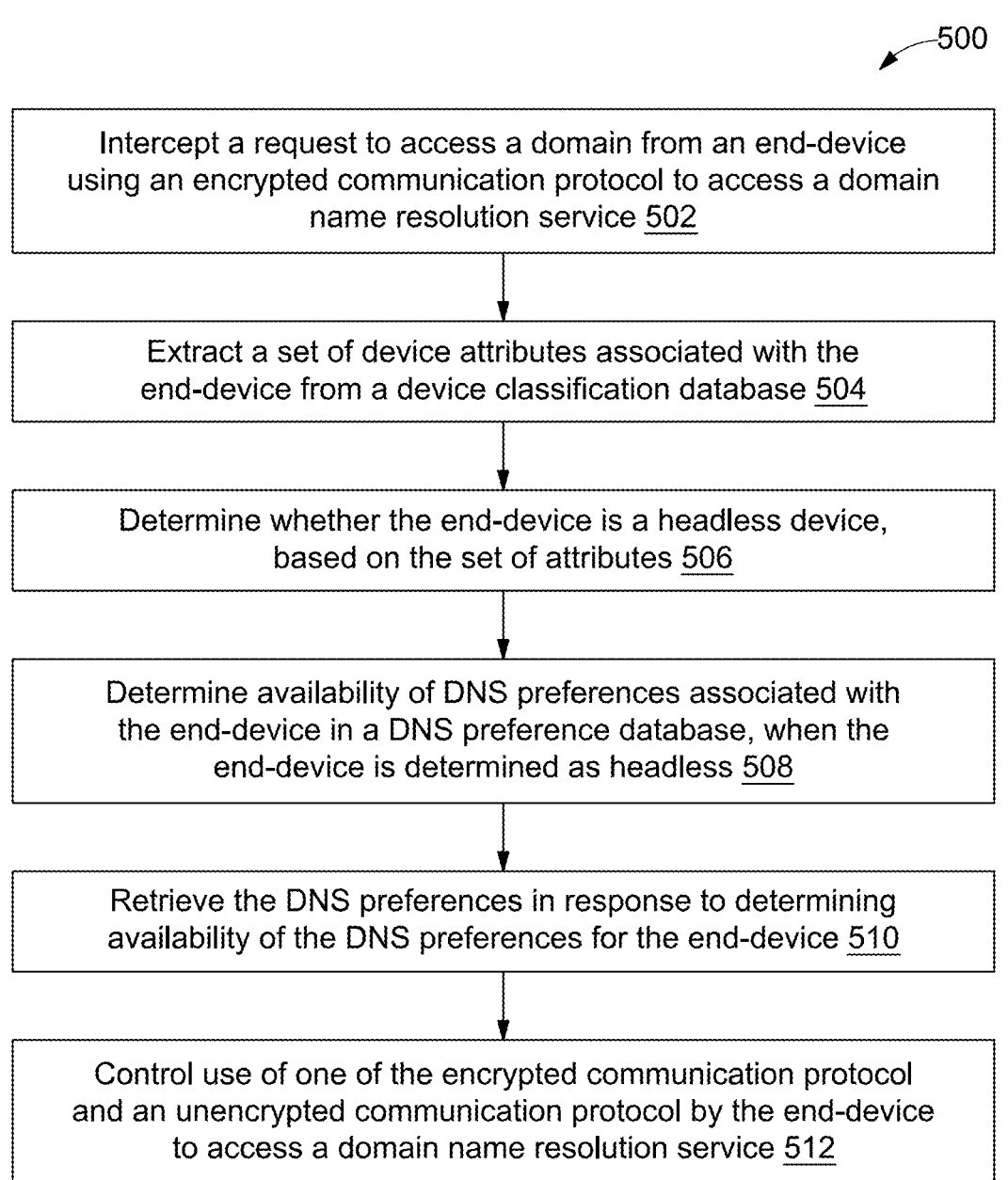

500

Intercept a request to access a domain from an end-device using an encrypted communication protocol to access a domain name resolution service 502

Extract a set of device attributes associated with the end-device from a device classification database 504

Determine whether the end-device is a headless device, based on the set of attributes 506

Determine availability of DNS preferences associated with the end-device in a DNS preference database, when the end-device is determined as headless 508

Retrieve the DNS preferences in response to determining availability of the DNS preferences for the end-device 510

Control use of one of the encrypted communication protocol and an unencrypted communication protocol by the end-device to access a domain name resolution service 512

FIG. 5

METHOD, DEVICE, AND SYSTEM FOR MANAGING DOMAIN NAME RESOLUTION

TECHNICAL FIELD

The present disclosure relates generally to Domain Name System (DNS), and more specifically, but not exclusively, to a method, device, and system for managing domain name resolution.

BACKGROUND

A Domain Name System (DNS) translates a domain name (for example, www.xyz.com) to an IP address, for example "1.2.3.4.5." The IP address may correspond to a web server where the website associated with the domain name his hosted. It will be apparent that while the domain name is human readable, the IP address is machine readable. The DNS includes a DNS resolver that intercepts a DNS request initiated by an end-device to access the domain. The DNS resolver subsequently resolves the domain name to the IP address. To this end, the DNS resolver intercepts details related to the IP address mapped to the domain name as determined and shared by various servers (for example, DNS root name server and other name servers) within the DNS.

The DNS resolver may also implement DNS filtering to effectively restrict access to specific websites or applications by blocking some DNS requests. An end-device may use encrypted or unencrypted communication protocols for domain name resolution. The unencrypted communication protocols may include DNS over Transmission Control Protocol (TCP) or DNS over User Datagram Protocol (UDP). The encrypted communication protocols may include DNS over Transport Layer Security (TLS), DNS over Secure Socket Layer (SSL), or DNS over Hypertext Transfer Protocol Secure (HTTPS).

When the end-device uses an unencrypted communication protocol for domain name resolution of a DNS request, the DNS resolver may intercept the DNS request, inspect the intercepted packets with ease, and perform filtering of a requested domain name based on a filtering policy. Accordingly, the DNS resolver may block the DNS request or may respond back with the relevant IP address. However, when the end-device uses encrypted communication protocol for domain name resolution of a DNS request, the DNS resolver requires inspection based on the encrypted communication protocol being used (for example, DNS over SSL). This requires cumbersome management of root certificates on all end-devices. Moreover, such an inspection at the DNS resolver slows down user traffic.

In conventional systems, in order to perform DNS filtering, the DNS resolver may only allow those DNS requests that use an unencrypted communication protocol for domain name resolution. In other words, such conventional systems, block DNS requests that use an encrypted communication protocol for domain name resolution. In such a scenario, most of the end-devices (for example, laptops desktops, and phones) fallback to using an unencrypted communication protocol for domain name resolution of the DNS request. However, some end-devices (for example, headless devices) lack the capability to fallback to using an unencrypted communication protocol. As a result, such end-devices are not able to access desired websites or content on the internet, as their DNS requests are always blocked. This leads to bad user experience. Moreover, these issues are hard for administrators to notice and debug.

It is an object of the disclosure to mitigate the problems of the prior art.

BRIEF SUMMARY

In accordance with a first aspect of the disclosure there is provided a method of managing Domain Name System (DNS) resolution. The method may include blocking, by a network device, an end-device from accessing a domain for a predefined time duration, wherein the end-device is using an encrypted communication protocol to access a domain name resolution service. The method may further include determining, by the network device, failure of the end-device to switch to an unencrypted communication protocol to access the domain name resolution service, after expiry of the predefined time duration. The method may include identifying, by the network device, the end-device as a headless device. The method may further include permitting, by the network device, the end-device to access the domain name resolution service using the encrypted communication protocol.

In accordance with a second aspect of the disclosure there is provided a method of managing DNS resolution. The method may include intercepting, by a network device, a request to access a domain from an end-device. The end-device is using an encrypted communication protocol to access a domain name resolution service. The method may further include extracting, by the network device, a set of device attributes associated with the end-device from a device classification database. The method may include determining, by the network device, whether the end-device is a headless device, based on the set of device attributes. The method may further include determining, by the network device, availability of DNS preferences associated with the end-device in a DNS preferences database, when the end-device is determined as a headless device. The method may include retrieving, by the network device, the DNS preferences in response to determining availability of the DNS preferences for the end-device. The method may further include controlling, by the network device, use of one of the encrypted communication protocols and an unencrypted communication protocol by the end-device to access the domain name resolution service, based on the retrieved DNS preferences.

In accordance with a third aspect of the disclosure there is provided a network device. The network device may include a processor, and a memory communicably coupled to the processor and comprising processor instructions that when executed by the processor, cause the processor to block an end-device from accessing a domain for a predefine time duration. The end-device is using an encrypted communication protocol to access a domain name resolution service. The processor may further determine failure of the end-device to switch to an unencrypted communication protocol to access the domain name resolution service after the expiry of the predefined time duration. identify the end-device as a headless device. The processor may further permit the end-device to access the domain name resolution service using the encrypted communication protocol.

In accordance with a fourth aspect of the disclosure there is provided a system for managing DNS resolution. The system may include a network device. The network device may include a processor, and a memory communicably coupled to the processor and comprising processor instructions that when executed by the processor, cause the processor to block an end-device from accessing a domain for a predefined time duration, The end-device is using an encrypted communication protocol to access a domain name resolution service. The processor may further determine failure of the end-device to switch to an unencrypted communication protocol to access the domain name resolution service after expiry of the predefined time duration. The processor may further identify the end-device as a headless device. The processor may further permit the end-device to access the domain name resolution service using the encrypted communication protocol.

Further features of the disclosure will be apparent from the following description of preferred embodiments of the disclosure, which are given by way of example only.

BRIEF DESCRIPTION OF THE DRAWINGS

The present application can be best understood by reference to the following description taken in conjunction with the accompanying drawing figures, in which like parts may be referred to by like numerals.

FIG. 3 depicts data stored in a device classification database and a DNS preferences database, in an embodiment of the disclosure;

FIG. 4 illustrates a flowchart of an exemplary method for managing DNS resolution, in an embodiment of the disclosure;

FIG. 5 illustrates a flowchart of another exemplary method for managing DNS resolution, in an embodiment of the disclosure.

DETAILED DESCRIPTION OF THE DRAWINGS

The following description is presented to enable a person of ordinary skill in the art to make and use the disclosure and is provided in the context of particular applications and their requirements. Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that the disclosure might be practiced without the use of these specific details. In other instances, well-known structures and devices are shown in block diagram form in order not to obscure the description of the disclosure with unnecessary detail. Thus, the disclosure is not intended to be limited to the embodiments shown but is to be accorded the widest scope consistent with the principles and features disclosed herein.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
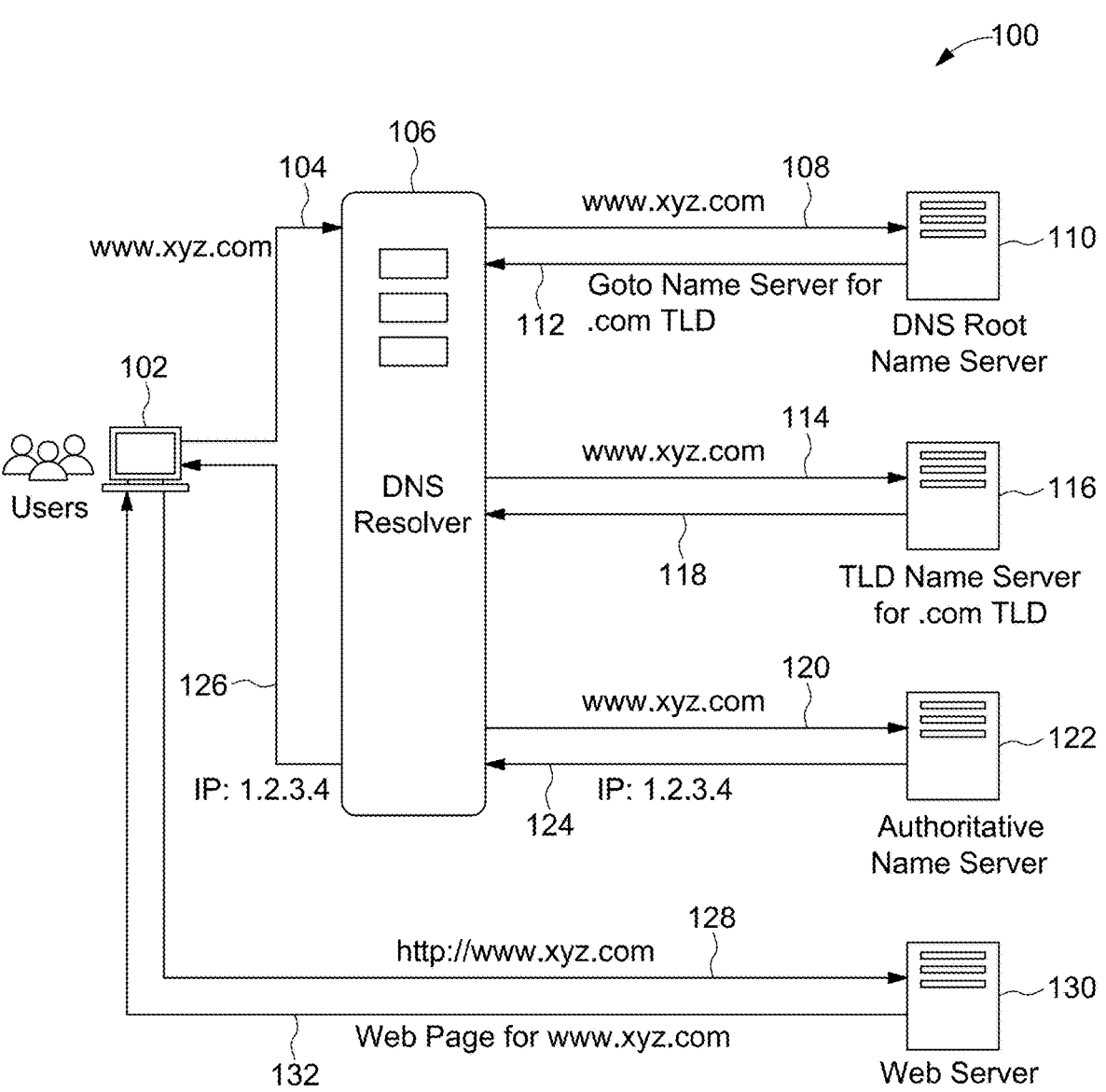
FIG. 1 is a flow diagram depicting a Domain Name System (DNS) translating a domain name to an Internet Protocol (IP) address.

FIG. 1 is a flow diagram depicting a Domain Name System (DNS) 100 translating a domain name to an Internet Protocol (IP) address. The DNS 100 is an environment where various embodiments of the disclosure may be employed. A user, via an end-device 102, may initiate 104 a DNS request by entering a domain name "www.xyz.com" into a web browser installed on the end-device 102. The end-device 102, for example, may include, but is not limited to a laptop, a desktop, a smartphone, a tablet, a phablet, a smart-TV, an Internet of Things (IoT) device, or any other mobile device.

The DNS request may be intercepted by a DNS resolver 106. The DNS resolver 106 may be managed by an Internet Service Provider (ISP) or a corporate network to which the end-device 102 is connected. The DNS resolver 106 may forward 108 the DNS request to a DNS root name server 110 that holds information about a plurality of Top-Level Domains (TLDs) on the Internet. Example of TLDs may include ".com," ".org," ".uk," ".in," or ".edu," etc. Since the requested domain is "www.xyz.com," the DNS root name server 110 may respond 112 to the DNS resolver 106 with details of a TLD name server 116 for the ".com" TLD.

The DNS resolver 106 may then send 114 the DNS request to the TLD name server 116, which may respond 118 back to the DNS resolver 106 with details of an authoritative name server 122 associated with the domain "www.xyz.com." Example of the authoritative name server 122 may be "Amazon® Route 53 name server." The authoritative name server 122 may include details of IP addresses associated with various domains within its hosted zones. The DNS resolver 106 may then forward 120 the DNS request to the authoritative name server 122.

The authoritative name server 122 may retrieve the IP address "1.2.3.4" associated with the requested domain from its hosted zone (e.g., "www.xyz.com"). Thereafter, the authoritative name server 122 may share 124 the IP address "1.2.3.4" with the DNS resolver 106, which may then return 126 the IP address "1.2.3.4" to the web browser used by the end-device 102. The DNS resolver 106 may cache the IP address "1.2.3.4" for future reference according to a specified Time to Live (TTL).

Finally, the web browser on the end-device 102 may send 128 a request to a web server 130 that corresponds to the obtained IP address "1.2.3.4" Thereafter, the web server 130 may send 132 a desired web page associated with the IP address "1.2.3.4." to the end-device 102.

As is apparent from the above description, the DNS resolver 106 acts a gateway that manages web access for the end-device 102. The DNS resolver 106 also employs DNS filtering, which is blocking DNS requests that include blacklisted or blocked domain names. If the end-device 102 is not able to resolve a DNS request, it won't be able to access the requested website or app. Once the DNS resolver 106 intercepts the DNS request and extracts the domain name being requested, the DNS resolver 106 determines whether the domain name is in a blacklisted category or not. Accordingly, the DNS resolver 106 blocks the DNS request or forwards it to the DNS root name server 110. The end-device 102 may use encrypted or unencrypted communication protocols to resolve the DNS request. The unencrypted communication protocols may include DNS over Transmission Control Protocol (TCP) or DNS over User Datagram Protocol (UDP). The encrypted communication protocols may include DNS over Transport Layer Security (TLS), DNS over Secure Socket Layer (SSL), or DNS over Hypertext Transfer Secure (HTTPS).

When the end-device 102 uses an unencrypted communication protocol to access domain name resolution service for the DNS request, the DNS resolver 106 may intercept the DNS request, easily extract the domain name being requested, and perform filtering based on a filtering policy. However, when the end-device 102 uses the encrypted communication protocol to access domain name resolution service for the DNS request, the DNS resolver 106 requires inspection based on the encrypted communication protocol being used in order to inspect the DNS request. This requires cumbersome management of root certificates on all end-devices.

In order to avoid cumbersome management of root certificates, conventional DNS resolvers employ filtering techniques that perform blanket or brute-force blocking of DNS requests received from end-devices that use encrypted communication protocol to access domain resolution service. In such a scenario, some end-devices (for example, headless devices) that lack the capability to fallback to an unencrypted communication protocol to access domain name resolution service. As a result, such end-devices are not able to access desired websites or content on the Internet, as their DNS requests are always blocked. This leads to bad user experience.

The techniques as disclosed in the present disclosure address these challenges by identifying headless devices, and accordingly allowing these devices to access DNS resolution services using encrypted communication protocols. The disclosed techniques ensure seamless operation for headless devices without compromising functionality of these end-devices, thereby addressing the critical challenges highlighted in the conventional solutions. The techniques are further explained in detail in conjunction with FIG. 2 to FIGS. 6A and 6B.

Figure 2:
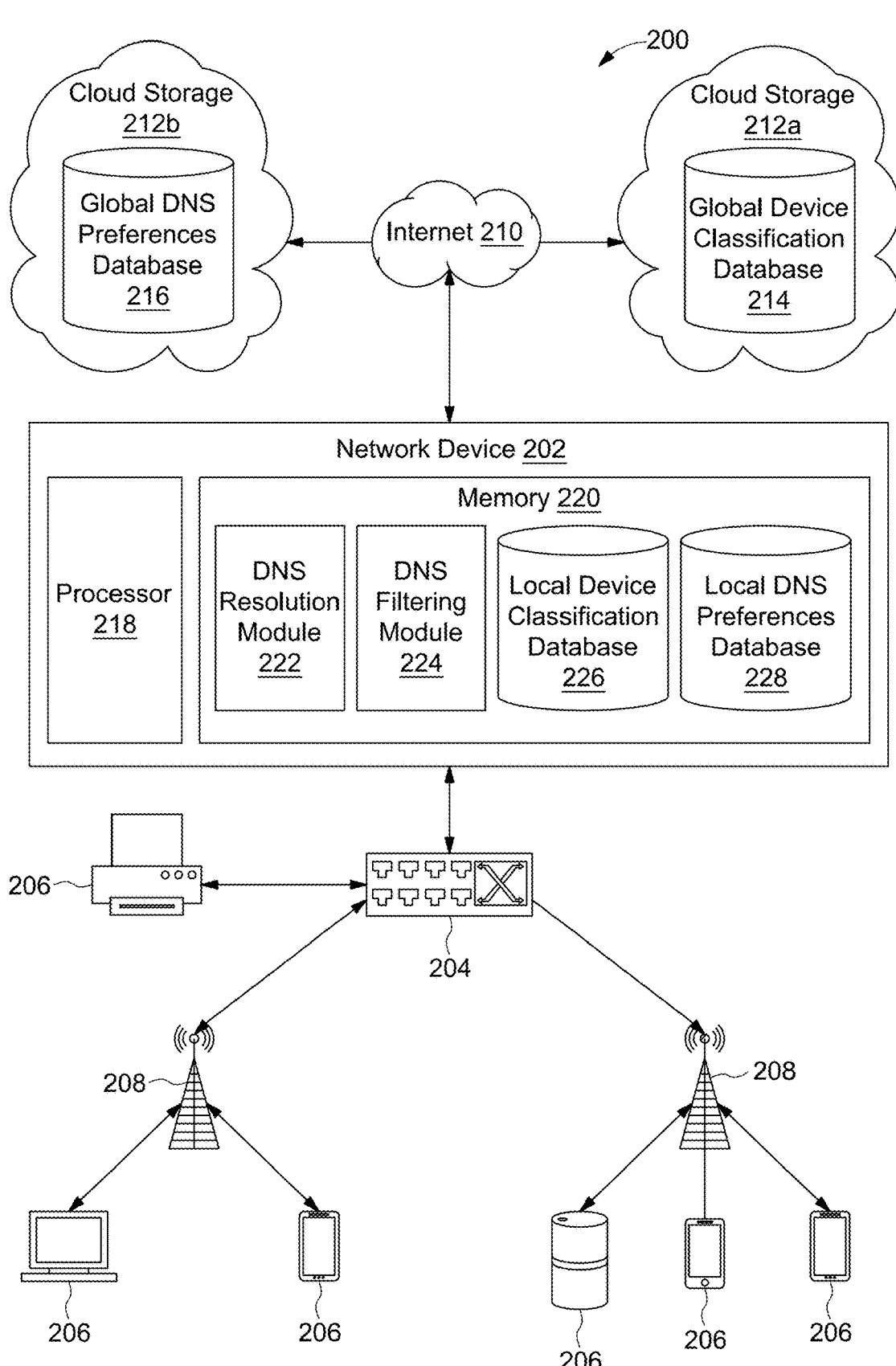
FIG. 2 is a block diagram of a system for managing DNS resolution and subsequent filtering, in an embodiment of the disclosure.

FIG. 2 is a block diagram of a system 200 for managing DNS resolution and subsequent filtering, in an embodiment of the disclosure. The system 200 may include a network device 202 that is communicatively coupled to an ethernet switch 204. The network device 202, for example, may be a router or a gateway that acts as a DNS resolver. The ethernet switch 204 acts as a bridge between a plurality of end-devices 206 and the network device 202. The plurality of end-devices 206 may include, but is not limited to a printer 206a, a laptop 206b, a smartphone 206c, an IOT device 206d, a mobile phone 206e, or a tablet 206f. The ethernet switch 204 may be communicatively coupled to each of the plurality of end-devices 206 either directly through a wired connection or via wireless access points 208 (for example, a wireless access points 208a and a wireless access points 208b).

On the other side, the network device 202 may also be communicatively coupled to the internet 210 and a cloud storge 212 (for example, a cloud storage 212a and a cloud storage 212b) through the internet 210. The cloud storage 212a may include a global device classification database 214 and the cloud storage 212b may include a global DNS preferences database 216. It will be apparent that the global device classification database 214 and the global DNS preferences database 216 may be collocated on a single cloud storage.

The global device classification database 214 may store Media Access Control (MAC) addresses of a set of end-devices, which are further mapped to device attributes for respective end-devices in the set of end-devices. The set of end-devices includes the plurality of end-devices 206. In an embodiment, the device attributes of an end-device may include, but are not limited to make, brand, whether the end-device is headless or not, a type associated with the end-device, Operating System (OS) used by the end-device, and the OS Version. The global DNS preferences database 216 may include a mapping of device attributes of each of the set of end-devices to respective DNS preferences. The DNS preferences of an end-device, for example, may include, but are not limited to whether the end-device is headless or not, the current communication protocol used by the end-device, and capability of the end-device to switch to unencrypted communication protocol. An exemplary embodiment depicting the global device classification database 214 and the global DNS preferences database 216 is depicted in FIG. 3.

While the ethernet switch 204 along with the plurality of end-devices 206 and the wireless access points 208 may form a Local Area Network (LAN) that is connected to the network device 202, the internet 210 and the cloud storage 212 may form a Wide-Area Network (WAN) that the network device 202 is connected to. Thus, the network device 202 controls access of the plurality of end-devices 206 to the internet 210. To this end, the network device 202 may include a processor 218 and a memory 220. The processor 218 may be a network processor provided by INTEL®, NVIDIA®, NXP®, ARM® (for example, 3200ACM, COR-TEX-A9 dual-core, or BCM4908) or QUALCOMM®. The memory 220 may be a non-volatile memory or a volatile memory. Examples of the non-volatile memory may include but are not limited to, a flash memory, a Read Only Memory (ROM), a Programmable ROM (PROM), Erasable PROM (EPROM), and Electrically EPROM (EEPROM) memory. Examples of the volatile memory may include but are not limited to, Dynamic Random Access Memory (DRAM), and Static Random-Access memory (SRAM).

The memory 220 may store instructions that, when executed by the processor 218, may cause the processor 218 to manage DNS resolution and subsequent filtering of DNS requests, as discussed in more detail below. The memory 220 may also include a DNS resolution module 222 and a DNS filtering module 224. In some embodiments, the network device 202 may include a local device classification database 226 and a local DNS preferences database 228.

The network device 202, which acts as the DNS resolver, may intercept a request to access a domain from an end-device from the plurality of end-devices 206. In an embodiment, the end-device may use an encrypted communication protocol to access a domain name resolution service configured in the DNS resolution module 222. In an embodiment, the encrypted communication protocol may be one of DNS over TLS, DNS over SSL, or DNS over HTTPS. The DNS resolution module 222 may extract a set of device attributes associated with the end-device from a device classification database (which may be one of the local device classification database 226 or the global device classification database 214). The local device classification database 226 may include similar data as the global device classification database 214, but for a subset of end-devices. The local device classification database 226 may be regularly updated by periodically synching with the global device classification database 214. An exemplary embodiment depicting the local device classification database 226 is depicted in FIG. 3.

Based on the set of device attributes extracted for the end-device, the DNS resolution module 222 may further determine whether the end-device is a headless device or not. If the DNS resolution module 222 identifies the end-device as a headless device, the DNS resolution module 222 may determine availability of DNS preferences associated with the end-device in a DNS preferences database (which may be one of the local DNS preferences database 228 or the global DNS preferences database 216). The DNS resolution module 222 may then retrieve the DNS preferences. The local DNS preferences database 228 may include similar data as the global DNS preferences database 216, but for a subset of the set of end-devices. In an embodiment, the local DNS preferences database 228 may be regularly updated by periodically synching with the global DNS preferences database 216. An exemplary embodiment depicting the local DNS preferences database 228 is depicted in FIG. 3.

Based on the retrieved DNS preferences for the end-device, the DNS resolution module 222 may then control use of one of the encrypted communication protocols and an unencrypted communication protocol by the end-device to access the domain name resolution service. The unencrypted communication protocols may include DNS over TCP or DNS over UDP. The encrypted communication protocols may include DNS over TLS, DNS over SSL, or DNS over HTTPS.

In an embodiment, the DNS preferences of the end-device may include the communication protocol currently being used by the end-device to access the domain name resolution service. The DNS preferences may additionally include inability of the end-device to switch to the unencrypted communication protocol to access the domain name resolution service. In other words, in addition to being determined as a headless device, it may be confirmed that the end-device cannot switch to the unencrypted communication protocol to access the domain name resolution service. The DNS resolution module 222 may then permit the end-device to access the domain name resolution service using the encrypted communication protocol. Thereafter, the DNS filtering module 224 may determine whether the domain requested by the end-device is included in a whitelist or a blacklist of domains. Accordingly, the DNS filtering module 224 may forward the request to access the domain to other servers in a DNS (for example, the DNS 100).

In some other embodiments, the DNS resolution module 222 may determine absence of the DNS preferences in the DNS preferences database. In such case, the DNS resolution module 222 may block the end-device from accessing the domain for a predefined time duration. If the end-device does not switch to the unencrypted communication protocol to access the domain name resolution service after expiry of the predefined time duration, the DNS resolution module 222 may determine that the end-device is a headless device. Accordingly, the DNS resolution module 222 may permit the end-device to access the domain name resolution service using the encrypted communication protocol.

In this case, the DNS resolution module 222 may subsequently update the DNS preferences database with the set of device attributes and DNS preferences associated with the end-device. The DNS preferences may include a communication protocol currently being used by the end-device to access the domain name resolution service. The DNS preferences may also include inability of the end-device to switch to the unencrypted communication protocol to access the domain name resolution service. As a result, whenever the end-device subsequently sends a request to access a domain, the DNS resolution module 222 would be able to retrieve the updated DNS preferences of the end-device and accordingly determine that end-device cannot switch to the unencrypted communication protocol to access the domain name resolution service.

FIG. 3 depicts data stored in a device classification database 302 and a DNS preferences database 304, in an exemplary embodiment of the disclosure. The device classification database 302 may be the local device classification database 226 or the global device classification database 214. The device classification database 302 may store MAC address for multiple end-devices mapped to respective device attributes of each of these multiple end-devices. The device attributes, for example, may include make, brand, whether the end-device is headless or not, type associated with the end-device, the OS used by the end-device, and the OS Version.

For ease of depiction, MAC address and mapped device attributes are provided for two end-devices in the device classification database 302. As depicted, a first end-device with MAC address "00:00:5e:00:53: af" is mapped to device attributes of the first end-device. Similarly, a second end-device with MAC address "2C:54:91:88:C9:E3" is mapped to device attributes of the second end-device. The MAC address thus acts as a unique identifier for an end-device to extract device attributes associated with that end-device from the device classification database 302.

The DNS preferences database 304 may be the local DNS preferences database 228 or the global DNS preferences database 216. The DNS preferences database 304 may include device attributes of multiple end-devices. These device attributes are mapped to a status with regards to a respective end-device being headless or not, a current communication protocol used by the respective end-device, and a capability of the respective end-device to switch to unencrypted communication protocol. For ease of depiction, the DNS preferences database 304 includes details for two devices, i.e., the first end-device and the second end-device. It will be apparent from FIG. 3 that the first end-device is a headless device that is currently using encrypted communication protocol and has inability to switch to an unencrypted communication protocol. In contrast, the second end-device is not a headless device that is currently using encrypted communication protocol and has the ability to switch to an unencrypted communication protocol.

FIG. 4 illustrates a flowchart of an exemplary method 400 for managing DNS resolution, in an embodiment of the disclosure. FIG. 4 is explained in conjunction with FIG. 2

At step 402, the network device 202 may block an end-device from accessing a domain for a predefined time duration. The end-device is using an encrypted communication protocol to access a domain name resolution service. The encrypted communication protocol may be one of DNS over TLS, DNS over SSL, or DNS over HTTPS.

At step 404, the network device 202 may perform a check to determine if the predefined time duration has expired or not. If the predefined time duration has not expired, the control moves back to the step 402. However, if the predefined time duration has expired, the network device 202, at step 406, may determine that the end-device has failed to switch to an unencrypted communication protocol to access the domain name resolution service. In other words, the network device 202 may determine that the end-device is not capable of switching to the unencrypted communication protocol. The unencrypted communication protocol may be one of DNS over TCP or DNS over UDP. Thereafter, at step 408, the network device 202 may identify the end-device as a headless device. At step 410, the network device 202 then permits the end-device to access the domain name resolution service using the encrypted communication protocol.

In some embodiments, at step 412, the network device 202 may retrieve a set of device attributes associated with the end-device from a device classification database. The device classification database may be the local device classification database 226 or the global device classification database 214. Thereafter, at step 414, the network device 202 may update a DNS preferences database with the set of device attributes and the DNS preferences for the end-device. The DNS preferences may include information that the end-device is a headless device and has inability to switch to an unencrypted communication protocol to access a domain name resolution service. The DNS preferences database may be one of the local DNS preferences database 228 or the global DNS preferences database 216.

FIG. 5 illustrates a flowchart of an exemplary method 500 for managing DNS resolution, in another embodiment of the disclosure. FIG. 5 is explained in conjunction with FIG. 2. At step 502, the network device 202 may intercept a request to access a domain from an end-device. The end-device may be using an encrypted communication protocol to access a domain name resolution service. At step 504, the network device 202 may extract a set of device attributes associated with the end-device from a device classification database. The device classification database may be the local device classification database 226 or the global device classification database 214. Based on the set of device attributes, at step 506, the network device 202 may determine whether the end-device is a headless device or not.

After the end-device is determined as a headless device, the network device 202, at step 508, may determine availability of DNS preferences associated with the end-device in a DNS preferences database. The DNS preferences database may be one of the local DNS preferences database 228 or the global DNS preferences database 216.

The network device 202 may then retrieve the DNS preferences for the end-device from the DNS preferences database, at step 510. The DNS preferences may include a communication protocol currently being used by the end-device to access the domain name resolution service and capability of the end-device to switch to an unencrypted communication protocol to access the domain name resolution service. At step 512, the network device 202 may control whether the end-device may use the encrypted communication protocol or an unencrypted communication protocol to access the domain name resolution service. This is further explained in detail in conjunction with FIGS. 6A and 6B.

Figure 6A:
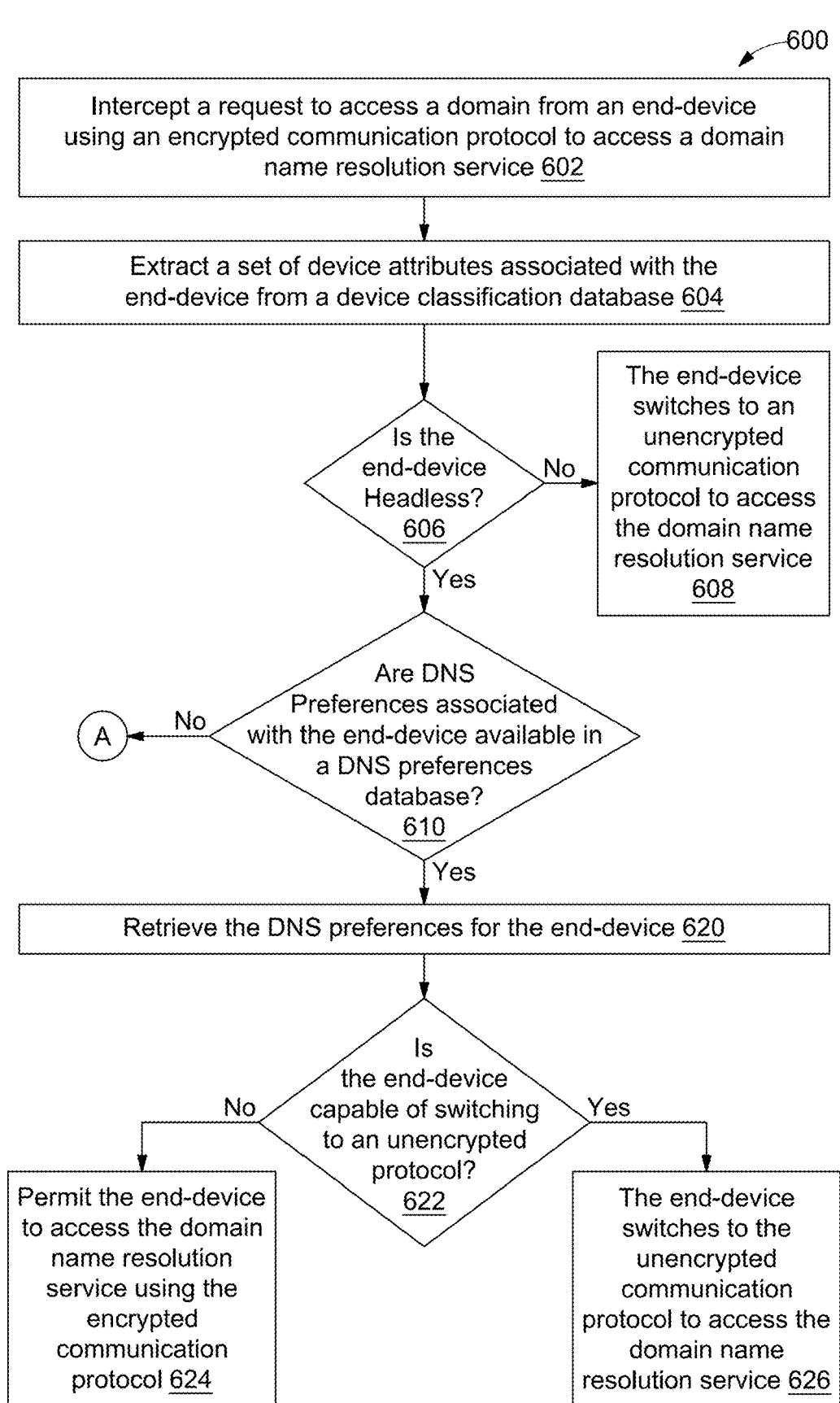
FIGS. 6A and 6B illustrate a detailed flowchart of an exemplary method for managing DNS resolution, in an embodiment of the disclosure.
Figure 6B:
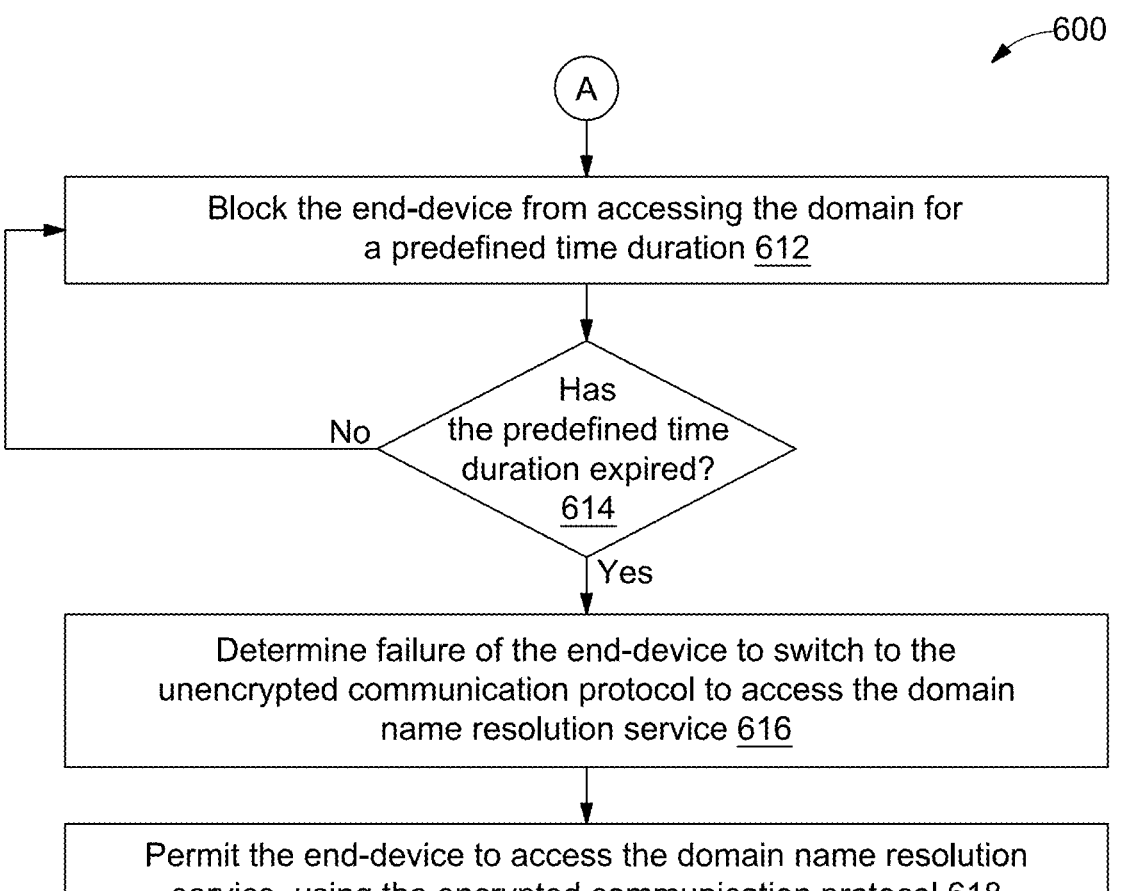

FIGS. 6A and 6B illustrate a detailed flowchart of an exemplary method 600 for managing DNS resolution, in an embodiment of the disclosure. FIGS. 6A and 6B are explained in conjunction with FIG. 4 and FIG. 5. At step 602, the network device 202 may intercept a request to access a domain from an end-device that is using an encrypted communication protocol to access a domain name resolution service. In an embodiment, the encrypted communication protocol may be one of DNS over TLS, DNS over SSL, or DNS over HTTPS. At step 604, the network device 202 may extract a set of device attributes associated with the end-device from a device classification database. Based on the set of device attributes, the network device 202 may perform a check, at step 606, to determine whether the end-device is a headless device or not. If the end-device is not a headless device, the end-device, at step 608, may switch to an unencrypted communication protocol to access the domain name resolution service. The unencrypted communication protocol may be one of DNS over TCP or DNS over UDP.

Referring back to step 606, if the end-device is determined to be a headless device, the network device 202 performs another check, at step 610, to determine whether DNS preferences associated with the end-device are available in a DNS preferences database. The DNS preferences may include a communication protocol currently being used by the end-device to access the domain name resolution service and the capability of the end-device to switch to the unencrypted communication protocol to access the domain name resolution service.

If the network device 202 determines absence of the DNS preferences for the end-device in the DNS preferences database, the network device 202, at step 612, may block the end-device from accessing the domain for a predefined time duration. Thereafter, at step 614, the network device 202 may perform a check to determine whether the predefined time duration has expired. If the predefined time duration has not expired, the control may move back to step 612. However, if the predefined time duration has expired and the end-device has failed to switch to the unencrypted communication protocol, the network device 202, at step 616, may determine that the end-device cannot switch to the unencrypted communication protocol to access the domain name resolution service. Thereafter, at step 618, the network device 202 may permit the end-device to access the domain name resolution service using the encrypted communication protocol.

Referring back to step 610, if the network device 202 determines availability of the DNS preferences associated with the end-device in the DNS preferences database, the network device 202 may retrieve the DNS preferences for the end-device at step 620. Thereafter, based on the retrieved DNS preferences, the network device 202, at step 622, may perform a check to determine whether the end-device is capable of switching to an unencrypted communication protocol or not. If the end-device has an inability to switch to the unencrypted communication protocol to access the domain name resolution service, the network device 202, at step 624, may permit the end-device to access the domain name resolution service using the encrypted communication protocol. However, if the end-device has the ability to switch to the unencrypted communication protocol, the end-device may automatically switch to the unencrypted communication protocol to access the domain name resolution service at step 626.

As will be appreciated by those skilled in the art, the techniques described in the various embodiments discussed above are not routine, or conventional, or well understood in the art.

Conventional DNS filtering techniques employ blanket or brute-force blocking of DNS requests received from end-devices that use encrypted communication protocol to access domain name resolution service. In such a scenario, most of the end-devices (for example, laptops desktops, and phones) fallback to resolving the DNS request using an unencrypted communication protocol. However, some end-devices (for example, headless devices) lack the capability to fallback to resolving the DNS request using an unencrypted communication protocol. As a result, such end-devices are not able to access desired websites or content on the internet, as their DNS requests are always blocked. This leads to bad user experience.

The techniques as discussed in the present disclosure for managing DNS resolution and subsequent filtering of domain names, address these challenges by identifying headless devices, and accordingly allowing these end-devices to access DNS resolution services using encrypted communication protocols. The disclosed techniques ensure seamless operation for headless devices without compromising functionality issues, thereby addressing the critical challenges highlighted in the conventional solutions.

The disclosed techniques firstly determine whether an end-device is a headless device or not. To this end, device attributes and DNS preferences (based on availability) associated with the end-device are checked to determine if the end-device is a headless device or not. The DNS preferences may include details as to the end-device being a headless device and its inability to switch to unencrypted communication protocol for domain name resolution. In absence of the DNS preferences, the disclosed techniques block the end-device if it is using an encrypted communication protocol from accessing a domain resolution service. If the end-device does not switch to an unencrypted communication protocol for accessing the domain resolution service within a predefined time duration, the end-device is determined as a headless device. Accordingly, the end-device now determined as a headless device is allowed to access domain name resolution service using an encrypted communication protocol. In contrast, other end-devices (that are not headless) switch to unencrypted communication protocol to access the domain name resolution service. Thus, the disclosed techniques ensure effective DNS filtering while accommodating various device configurations and DNS preferences. Further, by differentiating between end-device requirements, the disclosed techniques optimize network security without compromising operational efficiency.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of managing Domain Name System (DNS) filtering, the method comprising:

blocking, by a network device, an end-device from accessing a domain for a predefined time duration, wherein the end-device is using an encrypted communication protocol to access a domain name resolution service;

determining, by the network device, failure of the end-device to switch to an unencrypted communication protocol to access the domain name resolution service, after expiry of the predefined time duration;

identifying, by the network device, the end-device as a headless device; and permitting, by the network device, the end-device to access the domain name resolution service using the encrypted communication protocol.

2. The method of claim 1, further comprising retrieving a set of device attributes associated with the end-device from a device classification database.

3. The method of claim 2, further comprising updating a DNS preferences database with the set of device attributes and associated DNS preferences, in response to identifying the end-device as a headless device, wherein the DNS preferences comprise:

a communication protocol currently being used by the end-device to access the domain name resolution service; and inability of the end-device to switch to the unencrypted communication protocol to access the domain name resolution service.

4. The method of claim 1, wherein the unencrypted communication protocol is one of DNS over Transmission Control Protocol (TCP) or DNS over User Datagram Protocol (UDP).

5. The method of claim 1, wherein the encrypted communication protocol is one of DNS over Transport Layer Security (TLS), DNS over Secure Socket Layer (SSL), or DNS over Hypertext Transfer Protocol Secure (HTTPS).

6. A method of managing Domain Name System (DNS) filtering, the method comprising:

intercepting, by a network device, a request to access a domain from an end-device, wherein the end-device is using an encrypted communication protocol to access a domain name resolution service;

extracting, by the network device, a set of device attributes associated with the end-device from a device classification database;

determining, by the network device, whether the end-device is a headless device, based on the set of device attributes;

determining, by the network device, availability of DNS preferences associated with the end-device in a DNS preferences database, when the end-device is determined as a headless device; retrieving, by the network device, the DNS preferences in response to determining availability of the DNS preferences for the end-device; and controlling, by the network device, use of the encrypted communication protocol and an unencrypted communication protocol by the end-device to access the domain name resolution service, based on the retrieved DNS preferences.

7. The method of claim 6, wherein the DNS preferences comprise:

a communication protocol currently being used by the end-device to access the domain name resolution service; and inability of the end-device to switch to the unencrypted communication protocol to access the domain name resolution service.

8. The method of claim 7, wherein controlling comprises permitting the end-device to access the domain name resolution service using the encrypted communication protocol, based on the inability of the end-device to switch to the unencrypted communication protocol to access the domain name resolution service.

9. The method of claim 6, further comprising determining absence of the DNS preferences of the end-device in the DNS preferences database.

10. The method of claim 9, further comprising:

blocking the end-device from accessing the domain name resolution service for a predefined time duration;

determining failure of the end-device to switch to the unencrypted communication protocol to access the domain name resolution service after expiry of the predefined time duration; and permitting the end-device to access the domain name resolution service using the encrypted communication protocol.

11. A network device comprising:

a processor; and a memory communicatively coupled to the processor and comprising processor instructions that when executed by the processor, cause the processor to:

block an end-device from accessing a domain for a predefined time duration, wherein the end-device is using an encrypted communication protocol to access a domain name resolution service;

determine failure of the end-device to switch to an unencrypted communication protocol to access the domain name resolution service after the expiry of the predefined time duration;

identify the end-device as a headless device; and permit the end-device to access the domain name resolution service using the encrypted communication protocol.

12. The network device of claim 11, further comprising a device classification database configured to store device attributes for a plurality of first end-devices.

13. The network device of claim 12, wherein the processor instructions further cause the processor to retrieve a set of device attributes for the end-device from the device classification database.

14. The network device of claim 11, further comprising a DNS preferences database comprising device attributes of a plurality of second end-devices mapped to associated DNS preferences, wherein the DNS preferences mapped to a second end-device from the plurality of second end-devices comprise:

a communication protocol currently used by the second end-device to access the domain name resolution service; and an ability of the second end-device to switch to an unencrypted communication protocol to access the domain name resolution service.

15. The network device of claim 14, wherein the processor instructions further cause the processor to update the DNS preferences database with the set of device attributes of the end-device and the associated DNS preferences, in response to identifying the end-device as a headless device, and wherein the DNS preferences associated with the end-device comprise:

a communication protocol currently used by the end-device to access the domain name resolution service; and inability of the end-device to switch to the unencrypted communication protocol to access the domain name resolution service.

16. A system for managing Domain Name System (DNS) filtering, the system comprising:

a network device comprising:

a processor; and a memory communicatively coupled to the processor and comprising processor instructions that when executed by the processor, cause the processor to:

block an end-device from accessing a domain for a predefined time duration, wherein the end-device is using an encrypted communication protocol to access a domain name resolution service;

determine failure of the end-device to switch to an unencrypted communication protocol to access the domain name resolution service after the expiry of the predefined time duration;

identify the end-device as a headless device; and permit the end-device to access the domain name resolution service using the encrypted communication protocol.

17. The system of claim 16, wherein the network device further comprises a local device classification database configured to store device attributes for a plurality of first end-devices.

18. The system of claim 17, wherein the system comprises a global device classification database stored on a cloud, wherein the local device classification database is periodically updated by synching with the global device classification database.

19. The system of claim 16, wherein the network device further comprises a local DNS preferences database comprising device attributes of a plurality of second end-devices mapped to associated DNS preferences, wherein the DNS preferences mapped to a second end-device from the plurality of second end-devices comprise:

a communication protocol currently used by the second end-device to access domain name resolution service; and an ability of the second end-device to switch to an unencrypted communication protocol to access domain name resolution service.

20. The system of claim 19, wherein the system comprises a global DNS preferences database stored in a cloud, wherein the local DNS preferences database is periodically updated by synching with the global DNS preferences database.

* * * * *